United States Patent
Trainer et al.

(10) Patent No.: US 8,861,234 B2
(45) Date of Patent: Oct. 14, 2014

(54) VOLTAGE SOURCE CONVERTER HAVING CHAIN LINK CONVERTER FOR USE IN HIGH VOLTAGE DC TRANSMISSION

(75) Inventors: David Trainer, Alvaston (GB); Colin Davidson, Walton (GB); Ruchira Withanage, Stafford (GB); Adrian Keitley, Stafford (GB); Robert Whitehouse, Stafford (GB)

(73) Assignee: Alstom Technology Ltd, Baden (CH)

( * ) Notice: Subject to any disclaimer, the term of this patent is extended or adjusted under 35 U.S.C. 154(b) by 331 days.

(21) Appl. No.: 13/378,336

(22) PCT Filed: Jun. 15, 2009

(86) PCT No.: PCT/EP2009/057388
§ 371 (c)(1),
(2), (4) Date: Mar. 2, 2012

(87) PCT Pub. No.: WO2010/145690
PCT Pub. Date: Dec. 23, 2010

(65) Prior Publication Data
US 2013/0119970 A1    May 16, 2013

(51) Int. Cl.
*H02M 3/07*    (2006.01)
*H02M 7/483*    (2007.01)

(52) U.S. Cl.
CPC ........ *H02M 3/07* (2013.01); *H02M 2007/4835* (2013.01)
USPC ................................ 363/60; 363/51; 307/110

(58) Field of Classification Search
CPC .............................................. H02M 2007/4835
USPC .................. 363/59–60, 62; 307/110; 323/207
See application file for complete search history.

(56) References Cited

U.S. PATENT DOCUMENTS

| 3,867,643 | A | 2/1975 | Baker et al. |
| 4,053,820 | A | 10/1977 | Peterson et al. |
| 4,663,702 | A | 5/1987 | Tanaka |
| 4,816,736 | A | 3/1989 | Dougherty et al. |

(Continued)

FOREIGN PATENT DOCUMENTS

| DE | 195 35 552 | 4/1996 |
| DE | 101 03 031 | 7/2002 |

(Continued)

OTHER PUBLICATIONS

Allebrod, S. et al., "New Transformerless, Scalable Modular Multi-level Converters for HVDC—Transmission," Power Electronics Specialists Conference, IEEE, Jun. 15, 2008, pp. 174-179.

(Continued)

*Primary Examiner* — Harry Behm
(74) *Attorney, Agent, or Firm* — Nixon Peabody LLP

(57) ABSTRACT

A DC voltage source converter for use in high voltage DC power transmission comprising at least one chain-link converter connected between first and second DC terminals. The or each chain-link converter includes a chain of modules connected in series and each module including at least one pair of semiconductor switches connected in parallel with an energy storage device. The or each chain-link converter is operable when DC networks are connected to the first and second DC terminals to control switching of the modules to selectively charge or discharge the energy storage device of one or more of the modules, as required, to offset any difference in the DC voltage levels of the DC networks.

10 Claims, 10 Drawing Sheets

(56) References Cited

U.S. PATENT DOCUMENTS

| | | | |
|---|---|---|---|
| 5,093,583 | A | 3/1992 | Mashino et al. |
| 5,345,375 | A | 9/1994 | Mohan |
| 5,499,178 | A | 3/1996 | Mohan |
| 5,515,264 | A | 5/1996 | Stacey |
| 5,532,575 | A | 7/1996 | Ainsworth et al. |
| 5,644,482 | A * | 7/1997 | Asplund ............ 363/35 |
| 5,673,189 | A | 9/1997 | Schettler |
| 5,719,486 | A | 2/1998 | Taniguchi et al. |
| 5,726,557 | A | 3/1998 | Umeda et al. |
| 5,889,667 | A | 3/1999 | Bernet |
| 5,892,677 | A | 4/1999 | Chang |
| 5,936,855 | A | 8/1999 | Salmon |
| 5,999,422 | A | 12/1999 | Goransson et al. |
| 6,134,126 | A | 10/2000 | Ikekame et al. |
| 6,236,580 | B1 | 5/2001 | Aiello et al. |
| 6,301,130 | B1 | 10/2001 | Aiello et al. |
| 6,320,767 | B1 | 11/2001 | Shimoura et al. |
| 6,392,348 | B1 | 5/2002 | Dougherty |
| 6,879,062 | B2 | 4/2005 | Oates |
| 6,987,680 | B2 * | 1/2006 | Vire et al. ............ 363/124 |
| 7,170,767 | B2 | 1/2007 | Bixel |
| 7,274,576 | B1 | 9/2007 | Zargari et al. |
| 7,292,462 | B2 * | 11/2007 | Watanabe et al. ........ 363/60 |
| 7,298,115 | B2 | 11/2007 | Nishimura et al. |
| 7,499,291 | B2 | 3/2009 | Han |
| 7,622,825 | B2 | 11/2009 | Brune et al. |
| 8,188,720 | B2 | 5/2012 | Kim et al. |
| 8,390,259 | B2 | 3/2013 | Dommaschk et al. |
| 8,599,591 | B2 | 12/2013 | Crookes et al. |
| 2003/0202367 | A1 | 10/2003 | Schreiber |
| 2004/0218318 | A1 * | 11/2004 | Bijlenga et al. ............ 361/8 |
| 2005/0127853 | A1 | 6/2005 | Su |
| 2005/0135126 | A1 | 6/2005 | Gazel et al. |
| 2005/0146226 | A1 | 7/2005 | Trainer et al. |
| 2008/0002443 | A1 | 1/2008 | Ueda et al. |
| 2008/0007978 | A1 | 1/2008 | Han |
| 2008/0179951 | A1 | 7/2008 | Brune et al. |
| 2008/0205093 | A1 | 8/2008 | Davies et al. |
| 2008/0310205 | A1 | 12/2008 | Hiller |
| 2009/0027934 | A1 | 1/2009 | Bustos |
| 2009/0085548 | A1 * | 4/2009 | Suh et al. ............ 323/304 |
| 2009/0102436 | A1 | 4/2009 | Valderrama et al. |
| 2009/0206781 | A1 | 8/2009 | Itoh et al. |
| 2010/0067266 | A1 | 3/2010 | Dommaschk et al. |
| 2010/0118578 | A1 | 5/2010 | Dommaschk et al. |
| 2010/0309698 | A1 | 12/2010 | Asplund et al. |
| 2011/0018481 | A1 | 1/2011 | Hiller |
| 2011/0205768 | A1 | 8/2011 | Svensson |
| 2011/0260701 | A1 | 10/2011 | Horger et al. |
| 2012/0026767 | A1 | 2/2012 | Inoue et al. |
| 2012/0069610 | A1 | 3/2012 | Trainer et al. |
| 2012/0120697 | A1 | 5/2012 | Cuk |
| 2012/0127766 | A1 | 5/2012 | Crookes et al. |
| 2012/0170338 | A1 | 7/2012 | Trainer et al. |
| 2012/0182771 | A1 | 7/2012 | Trainer et al. |
| 2012/0188803 | A1 | 7/2012 | Trainer et al. |
| 2013/0026841 | A1 | 1/2013 | Hosini et al. |
| 2013/0051105 | A1 | 2/2013 | Wang et al. |
| 2013/0094264 | A1 | 4/2013 | Crookes et al. |
| 2013/0119970 | A1 | 5/2013 | Trainer et al. |
| 2013/0128629 | A1 | 5/2013 | Clare et al. |
| 2013/0128636 | A1 | 5/2013 | Trainer et al. |
| 2013/0182467 | A1 | 7/2013 | Cross et al. |
| 2013/0194838 | A1 | 8/2013 | Jang et al. |
| 2013/0208514 | A1 | 8/2013 | Trainer et al. |
| 2013/0208521 | A1 | 8/2013 | Trainer et al. |
| 2013/0279211 | A1 | 10/2013 | Green et al. |
| 2014/0098575 | A1 | 4/2014 | Whitehouse |
| 2014/0146583 | A1 | 5/2014 | Trainer et al. |

FOREIGN PATENT DOCUMENTS

| | | |
|---|---|---|
| GB | 2 294 821 | 5/1996 |
| GB | 2 418 079 | 3/2006 |
| WO | 97/02639 | 1/1997 |
| WO | 02/063758 | 8/2002 |
| WO | 03/055048 | 7/2003 |
| WO | 2007/028350 | 3/2007 |
| WO | 2007028349 A1 | 3/2007 |
| WO | 2008/086760 | 7/2008 |
| WO | 2009/149743 | 12/2009 |
| WO | 2010/025758 | 3/2010 |
| WO | 2010/069371 | 6/2010 |
| WO | WO 2010/088969 | 8/2010 |
| WO | 2010/145689 | 12/2010 |
| WO | 2010/149200 | 12/2010 |
| WO | WO 2010/145688 | 12/2010 |
| WO | 2011/012171 | 2/2011 |
| WO | 2011/012174 | 2/2011 |
| WO | 2011/050847 | 5/2011 |
| WO | 2011/098117 | 8/2011 |
| WO | 2011/113471 | 9/2011 |
| WO | 2011/124258 | 10/2011 |
| WO | 2011/127980 | 10/2011 |
| WO | 2011/157300 | 12/2011 |
| WO | 2012/013248 | 2/2012 |
| WO | 2012/167826 | 12/2012 |
| WO | 20131000510 | 1/2013 |

OTHER PUBLICATIONS

Knudsen, L. et al., "Description and Prospective Applications of New Multi-Terminal HVDC System Concepts," CIGRE Conf. Internationale Des Grands Reseaux Electriques, Aug. 26-Sep. 1, 1990, pp. 1-11.

Glinka M., "Prototype of Multiphase Modular-Multilevel-Converter With 2MW Power Rating and 17-Level-Output-Voltage," 2004 35th Annual IEEE Power Electronics Specialists Conference, Jun. 20-25, 2004, pp. 2572-2576.

Lesnicar, A. et al., "An Innovative Modular Multilevel Converter Topology Suitable for a Wide Power Range," 2003 IEEE Bologna PowerTech Conference, Jun. 23-26, 2003, pp. 1-6.

International Search Report and Written Opinion in International Application No. PCT/EP2009/057388, mailed Mar. 18, 2010, 11 sheets.

Notice of Allowance in U.S. Appl. No. 13/576,920, mailed on Mar. 20, 2014, 8 pages.

Allebrod, S. et al., "New Transformerless, Scalable Modular Multilevel Converters for HVDC—Transmission", Power Electronics Specialists Conference, IEEE, Jun. 15, 2008, pp. 174-179.

Baran M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.

Guanjun Ding et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", IIEE 0/7803-8886-0/05 CCECE/CCGEI, Saskatoon, May 2005, pp. 458-461.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

(56) References Cited

OTHER PUBLICATIONS

Zhang, W. et al., "Active DC Filter for HVDC Systems", IEEE Computer Applications in Power, vol. 7, No. 1, Jan. 1994, New York, USA, pp. 40-44.
PCT International Preliminary Report on Patentability in International Application No. PCT/EP2009/057388, mailed on Dec. 14, 2011, 7 pages.
PCT International Search Report and Written Opinion in International Application No. PCT/EP2009/057736, mailed on Mar. 26, 2010, 6 pages.
PCT International Preliminary Report on Patentability in International Application No. PCT/EP2009/057736, mailed on Nov. 24, 2011, 12 pages.
PCT International Search Report and Written Opinion in International Application No. PCT/EP2009/059973, mailed on Aug. 13, 2010, 12 pages.
PCT International Preliminary Report on Patentability in International Application No. PCT/EP2009/059973, mailed on Oct. 5, 2011, 17 pages.
PCT International Search Report and Written Opinion in International Application No. PCT/EP2010/051572, mailed on Jan. 19, 2011, 15 pages.
PCT International Preliminary Report on Patentability in International Application No. PCT/EP2010/051572, mailed on Apr. 20, 2012, 17 pages.
PCT International Search Report and Written Opinion in International Application No. PCT/EP2010/053290, mailed on Feb. 11, 2011, 10 pages.
PCT International Preliminary Report on Patentability in International Application No. PCT/EP2010/053290, mailed on Apr. 20, 2012, 13 pages.
PCT International Search Report and Written Opinion in International Application No. PCT/EP2010/054660, mailed on Feb. 24, 2011, 16 pages.
PCT International Preliminary Report on Patentability in International Application No. PCT/EP2010/054660, mailed on Jun. 6, 2012, 30 pages.
PCT International Search Report for International Application No. PCT/EP2010/054974, mailed on Mar. 4, 2011, 14 pages.
PCT International Preliminary Report on Patentability in International Application No. PCT/EP2010/054974, mailed on Aug. 10, 2012, 19 pages.
PCT International Search Report and Written Opinion in International Application No. PCT/EP2010/058630, mailed on Apr. 19, 2011, 14 pages.
PCT International Preliminary Report on Patentability in International Application No. PCT/EP2010/058630, mailed on Dec. 19, 2012, 16 pages.
PCT International Search Report and Written Opinion for Application No. PCT/EP2010/061145, mailed on Jun. 5, 2011, 4 pages
PCT International Preliminary Report on Patentability in International Application No. PCT/EP2010/061145, mailed on Aug. 20, 2012, 16 pages.
PCT International Search Report and Written Opinion in International Application No. PCT/EP2011/059514, mailed on Jul. 5, 2012, 10 pages.
PCT International Preliminary Report on Patentability in International Application No. PCT/EP2011/059514, mailed on Aug. 1, 2013, 14 pages.
PCT International Search Report and Written Opinion in International Application No. PCT/EP2011/060907, mailed on Jul. 16, 2012, 3 pages.
PCT International Preliminary Report on Patentability in International Application No. PCT/EP2011/060907, mailed on Sep. 24, 2013, 6 pages.
Office Action in U.S. Appl. No. 13/388,277, mailed on Nov. 22, 2013, 18 pages.
Notice of Allowance in U.S. Appl. No. 13/380,500, mailed on Jun. 11, 2013, 13 pages.
Notice of Allowance in U.S. Appl. No. 13/380,500, mailed on Jul. 31, 2013, 14 pages.
Notice of Allowance in U.S. Appl. No. 13/576,920, mailed on Dec. 4, 2013, 11 pages.
U.S. Appl. No. 14/129,923, 29 pages.
Hagiwara, Makoto et al., "PWM Control and Experiment of Modular Multilevel Converters", Power Electronics Specialists Conference (PESC), Rhodes, Jun. 15-19, 2008, IEEE, pp. 154-161.
Lesnicar, A. et al., "A New Modular Voltage Source Inverter Topology", European Power Electronics Conference (EPE), Toulouse, France, Sep. 2-4, 2003, 10 pages.
Raju, N. Ravisekhar, "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.
Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.
Office Action in U.S. Appl. No. 13/388,277, mailed on Jul. 3, 2014, 14 pages.
Office Action in U.S. Appl. No. 13/639,844, mailed on May 22, 2014, 8 pages.
Notice of Allowance in U.S. Appl. No. 13/640,468, mailed on Jun. 4, 2014, 13 pages.
Notice of Allowance in U.S. Appl. No. 13/813,414, mailed on Jun. 2, 2014, 12 pages.
Notice of Allowance in U.S. Appl. No. 13/818,654, mailed on May 30, 2014, 10 pages.
Notice of Allowance in U.S. Appl. No. 13/576,920, mailed on Jun. 9, 2014, 5 pages.
First Chinese Office Action in Application No. 200980160700.4, mailed Jun. 25, 2014, 20 pages.

* cited by examiner

VOLTAGE SOURCE CONVERTER HAVING CHAIN LINK CONVERTER FOR USE IN HIGH VOLTAGE DC TRANSMISSION

CROSS-REFERENCE TO RELATED PATENT APPLICATION

The present application is a National Stage Application of International Application No. PCT/EP2009/057388 entitled "Converter" filed Jun. 15, 2009, the contents of which are incorporated herein by reference in its entirety.

The invention relates to a direct current (DC) voltage source converter for use in high voltage direct current (HVDC) power transmission.

In power transmission networks, AC power is typically converted to direct current (DC) power for transmission via overhead lines and/or under-sea cables. This conversion means that it is not necessary to compensate for AC capacitive load effects that are otherwise imposed by the transmission line or cable. This in turn reduces the cost per kilometer of the lines and/or cables and thus conversion of AC power to DC power becomes cost-effective when power needs to be transmitted over a long distance.

DC transmission and distribution networks are needed to support the emergence of HVDC power transmission. These DC transmission and distribution networks however often operate at different voltage levels, which can create difficulties when interconnecting the DC networks to form a DC power grid.

It is therefore desirable to provide a DC voltage source converter for use in HVDC power transmission that is operable to facilitate the transfer of electrical power between DC networks operating at different voltage levels.

One solution lies in the use of a transformer within a DC to DC power converter.

Transformers operate to step up or step down AC voltages and thereby facilitate the interconnection of AC networks operating at different voltage levels. In order to interconnect DC networks operating at different voltage levels using a transformer, the DC power must be converted to AC power on each side of the transformer so as to enable the transformer to effect the necessary step up or step down in AC voltage between the two networks.

The inclusion of AC to DC voltage converters, in addition to a transformer, increases the size, weight and cost of the DC power transmission infrastructure, and therefore results in an undesirable arrangement.

Another solution lies in the use of a direct DC to DC power converter arrangement 20, such as that shown in FIG. 1, which includes an inductor 22 connected in series, and a capacitor 24 connected in parallel, between two DC terminals 26,28. Arrangements of this type are often used in applications such as traction drives to step up or step down the DC voltage in order to optimize the operation of the DC network and connected electrical loads.

The arrangement shown in FIG. 1 avoids the need for intermediate DC to AC converters and therefore results in a smaller, lighter and less costly arrangement than would otherwise be obtained through the use of a transformer.

Conventional DC to DC power converters, such as the DC to DC power converter shown in FIG. 1, are however designed for operation at 10's or 100's of kW. In contrast, HVDC power transmission typically involves 10's or 100's of MW.

It is possible to modify the direct DC to DC power converter shown in FIG. 1 to operate at higher levels of power. This may be done by replacing electronic switches 21, 23 connected in parallel and series branches between the DC terminals with high power electronic switches provided in the form of multiple insulated-gate bipolar transistors (IGBTs) connected in series. The connection of IGBT devices in series strings however often requires complex active gate drives and large passive components to control voltage sharing between the multiple transistors, and again therefore results in an undesirable arrangement.

According to an aspect of the invention, there is provided a DC voltage source converter for use in high voltage DC power transmission comprising at least one chain-link converter connected between first and second DC terminals, the or each chain-link converter including a chain of modules connected in series and each module including at least one pair of semiconductor switches connected in parallel with an energy storage device, wherein the or each chain-link converter is operable when DC networks are connected to the first and second DC terminals to control switching of the modules to selectively charge or discharge the energy storage device of one or more of the modules, as required, to offset any difference in the DC voltage levels of the DC networks.

The use of a chain-link converter including a plurality of individual modules allows different levels of voltage to be constructed. High voltage levels in power transmission can therefore be accommodated by increasing the number of modules in the chain-link converter.

The chain-link converter can be made to operate as a voltage multiplier circuit simply by allowing the energy storage device in each module of the chain to independently charge to the supply voltage rail by putting the adjacent modules into a bypass state. An output supply voltage may then by constructed by connecting the energy storage devices of a number of individual modules in series to produce a controlled output voltage. Given that the individual energy storage devices will inherently discharge during this period, the number of modules connected in series can be progressively increased to maintain the desired output voltage profile if desired.

Switching strategies that equalize the charge transfer during both the charging and discharging cycles are necessary to ensure voltage equalization.

The semiconductor switches are preferably constructed from insulated-gate bipolar transistors. However, in other embodiments, the switches may be constructed from gate turn-off thyristors or field-effect transistors.

The or each pair of semiconductor switches in each module is controllable to insert an energy storage device into the circuit or to cause a short circuit to bypass the energy storage device.

The energy storage device provided in each module is preferably a capacitor, but in other embodiments may be a fuel cell, a battery or an AC electrical generator and rectifier, each device being additionally capable of providing a source of real power.

The use of a chain-link type converter allows the use of a converter that is unidirectional (i.e. produces voltage steps in one polarity only) or bidirectional (i.e. produces voltage steps in both positive and negative polarities).

In order to provide a unidirectional single-phase multilevel converter, the semiconductor switches of each module may preferably be connected with the respective energy storage device in a half-bridge arrangement to define a 2-quadrant unipolar module that can develop zero or positive voltage but can conduct current in both directions.

In order to provide a bidirectional single-phase multilevel converter, the semiconductor switches of each module may preferably be connected with the respective energy storage device in a full-bridge arrangement to define a 4-quadrant bipolar module that can develop positive or negative voltage and can also conduct current in both directions.

The bidirectional characteristic of the 4-quadrant bipolar module is advantageous because it may be utilized to provide voltage inversion and to provide a voltage step up and step down capability in the same DC voltage source converter.

Preferably the DC voltage source converter includes a switching assembly to toggle between electrical charging and discharging of the or each module.

The switching assembly allows the timing of the charging and discharging operations to be manipulated in a controlled manner, and in embodiments of the invention may include one or more diodes.

The use of one or more diodes provides an automatic switching system whereby the operation of the DC voltage source converter switches between module charging and discharging by forward or reverse biasing the diode, which alters the direction of current flow.

In embodiments of the invention a chain-link converter may be connected in parallel with the first DC terminal and may be connected in parallel with a series arrangement of the second DC terminal and the switching assembly.

This arrangement creates a parallel converter which allows electrical power to be transferred from a lower DC voltage to a higher DC voltage.

In other embodiments of the invention a series arrangement of a chain-link converter and the second DC terminal may be connected in parallel with the first DC terminal and may be connected in parallel with the switching assembly.

This arrangement creates a parallel converter which allows electrical power to be transferred from a higher DC voltage to a lower DC voltage.

In further embodiments of the invention a first chain-link converter may be connected in parallel with the first DC terminal and may be connected in parallel with a series arrangement of the second DC terminal and a second chain-link converter.

This arrangement combines the functions of the parallel and series converters, resulting in a flexible DC voltage source converter.

In yet further embodiments the DC voltage source converter may include one or more inductors connected in series with either or each of the first and second DC terminals. The inclusion of an inductor helps to regulate the flow of current flowing into the DC networks.

Preferred embodiments of the invention will now be described, by way of non-limiting examples, with reference to the accompanying drawings in which.

Figure 1:
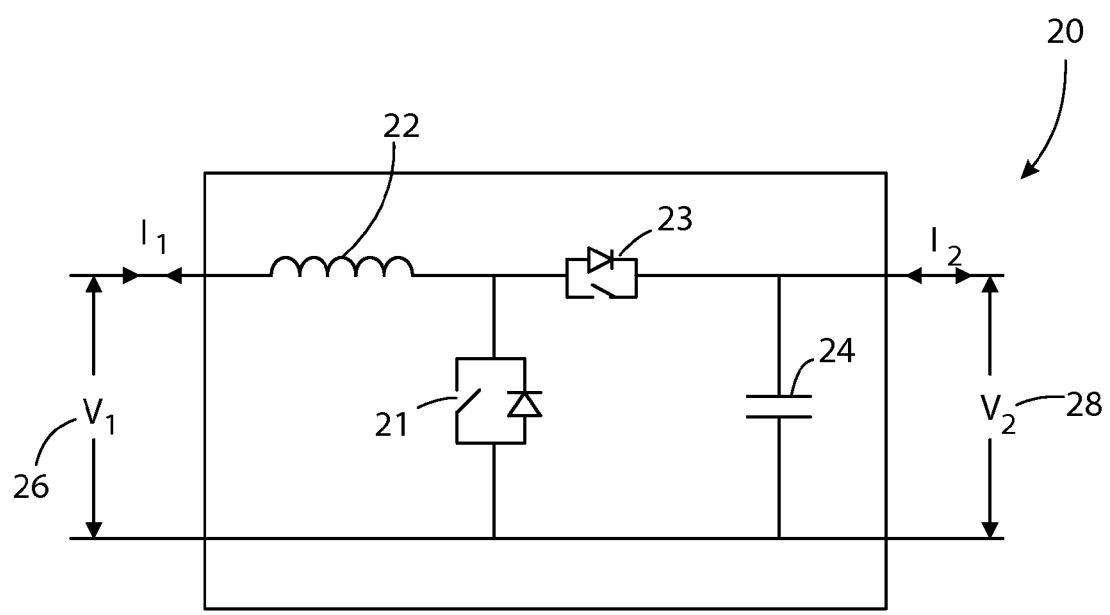
FIG. 1 shows, in schematic form, a prior art voltage source converter for DC to DC voltage conversion in the 10's to 100's of kW range.
Figure 2A:
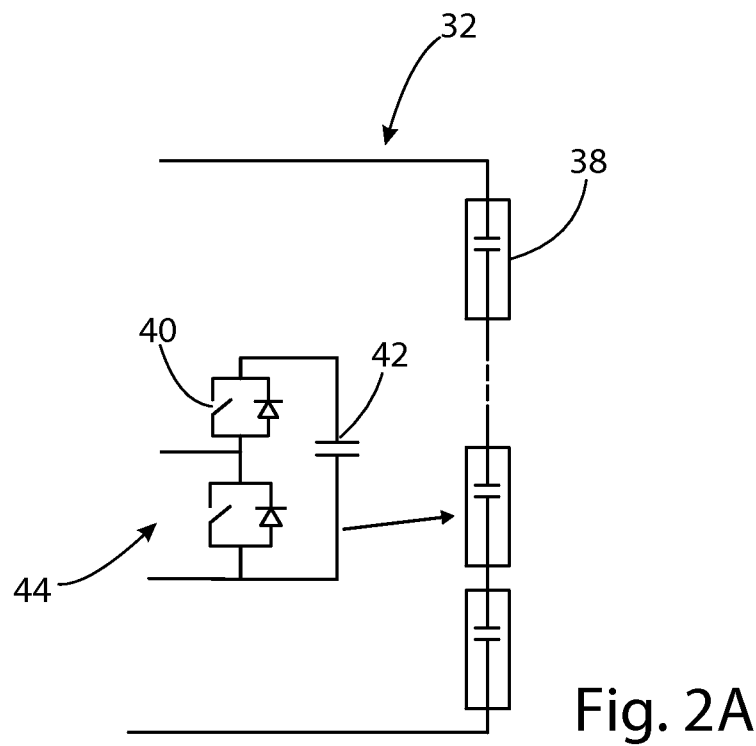
FIG. 2A shows the structure of a 2-quadrant unipolar module and its location in a chain-link converter.
Figure 2B:
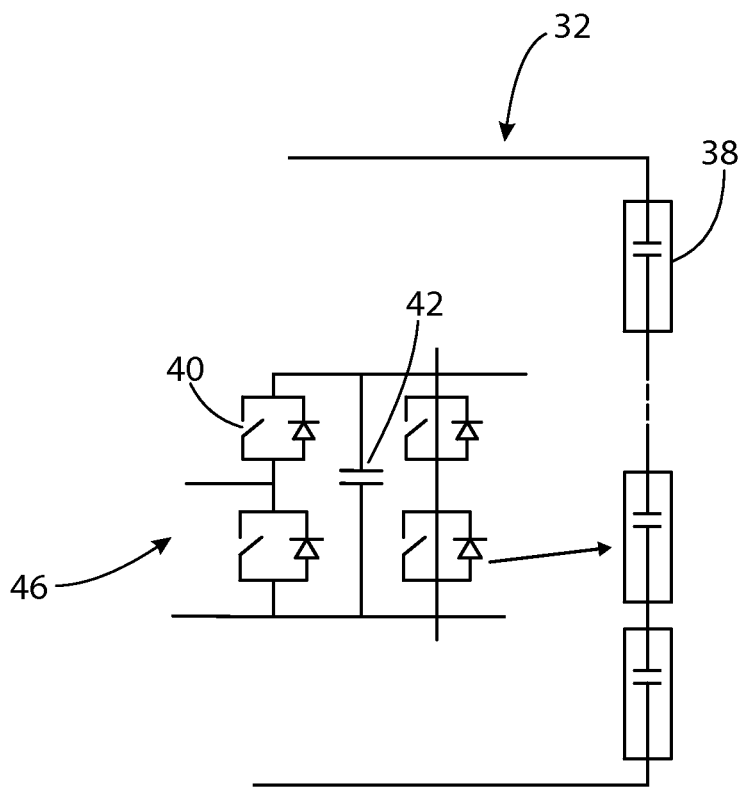
FIG. 2B shows the structure of a 4-quadrant bipolar module and its location in a chain-link converter.
Figure 3:
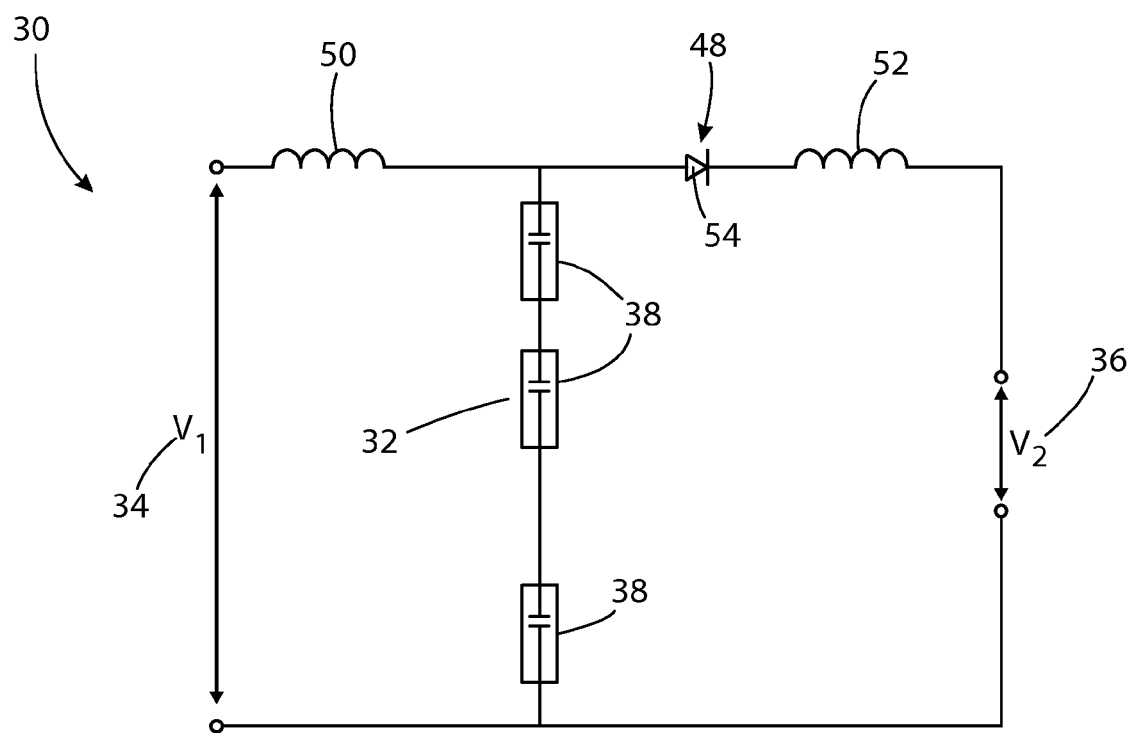
FIG. 3 shows a parallel DC voltage source converter according to a first embodiment of the invention.

A DC voltage source converter 30 for use in high voltage DC power transmission according to an embodiment of the invention is shown in FIG. 3. The converter 30 includes a chain-link converter 32 connected between first and second DC terminals 34, 36. The chain-link converter 32 includes a chain of modules 38 connected in series, each module 38 including at least one pair of semiconductor switches 40 (FIGS. 2A and 2B) connected in parallel with an energy storage device 42.

The chain-link converter 32 is operable when DC networks are connected to the first and second DC terminals 34, 36 to control switching of the modules 38 to selectively charge or discharge the energy storage device 42 of one or more of the modules 38, as required, to offset any difference in the DC voltage levels of the DC networks.

The transfer of power between DC networks connected to the first and second DC terminals 34, 36 requires the DC voltage of one of the networks to be stepped up or down in order to match the DC voltage of the other network.

The use of a chain-link converter 32 allows independent switching of individual chain-link modules 38 to bypass each module 38 or to insert each module 38 into the circuit.

Inserting a module 38 into the circuit enables an uncharged module 38 to be electrically charged by an input voltage, or a charged module 38 to be electrically discharged to an output voltage. In addition, the use of a chain-link converter 32 permits a plurality of modules 38 to be inserted into the circuit for simultaneous electrical charging or discharging.

In the embodiment shown in FIG. 2A the modules 38 in the chain-link converter 32 may be formed from half-bridge elements 44 whereby, in each element 44, the semiconductor switches 40 are connected with the respective energy storage device 42 in a half-bridge arrangement to define a 2-quadrant unipolar module 38 that can develop zero or positive voltage and can conduct current in both directions.

In the embodiment shown in FIG. 2B the modules 38 in the chain-link converter 32 may be formed from full-bridge elements 46 whereby, in each element 46, the semiconductor switches 40 of each module 38 are connected with the respective energy storage device 42 in a full-bridge arrangement to define a 4-quadrant bipolar module 38 that can develop zero, positive or negative voltage and can conduct current in both directions.

In each of the embodiments shown in FIGS. 2A and 2B, the energy storage device 42 of each module 38 is a capacitor. It is envisaged that in other embodiments the energy storage device 42 may be a fuel cell, battery or AC electrical generator with local rectification.

In the converter 30 shown in FIG. 3, the chain-link converter 32 is connected in parallel with the first DC terminal 34 and is connected in parallel with a series arrangement of the second DC terminal 36 and a switching assembly 48. A first inductor 50 is connected in series with the first DC terminal 34 while a second inductor 52 is connected in series with the second DC terminal 36.

The switching assembly 48 is utilised to toggle between electrical charging and discharging of the or each module 38, which are preferably half-bridge 44 or full-bridge elements 46.

In the embodiment shown in FIG. 3 the switching assembly 48 includes a diode 54 but, in other embodiments, may include any passive or active switching means that provides a similar function.

Operation of the converter 30 will now be described with reference to FIGS. 4A and 4B in which a DC network connected to the first DC terminal 34 has a DC voltage that is lower than the DC network connected to the second DC terminal 36.

Figure 4A:
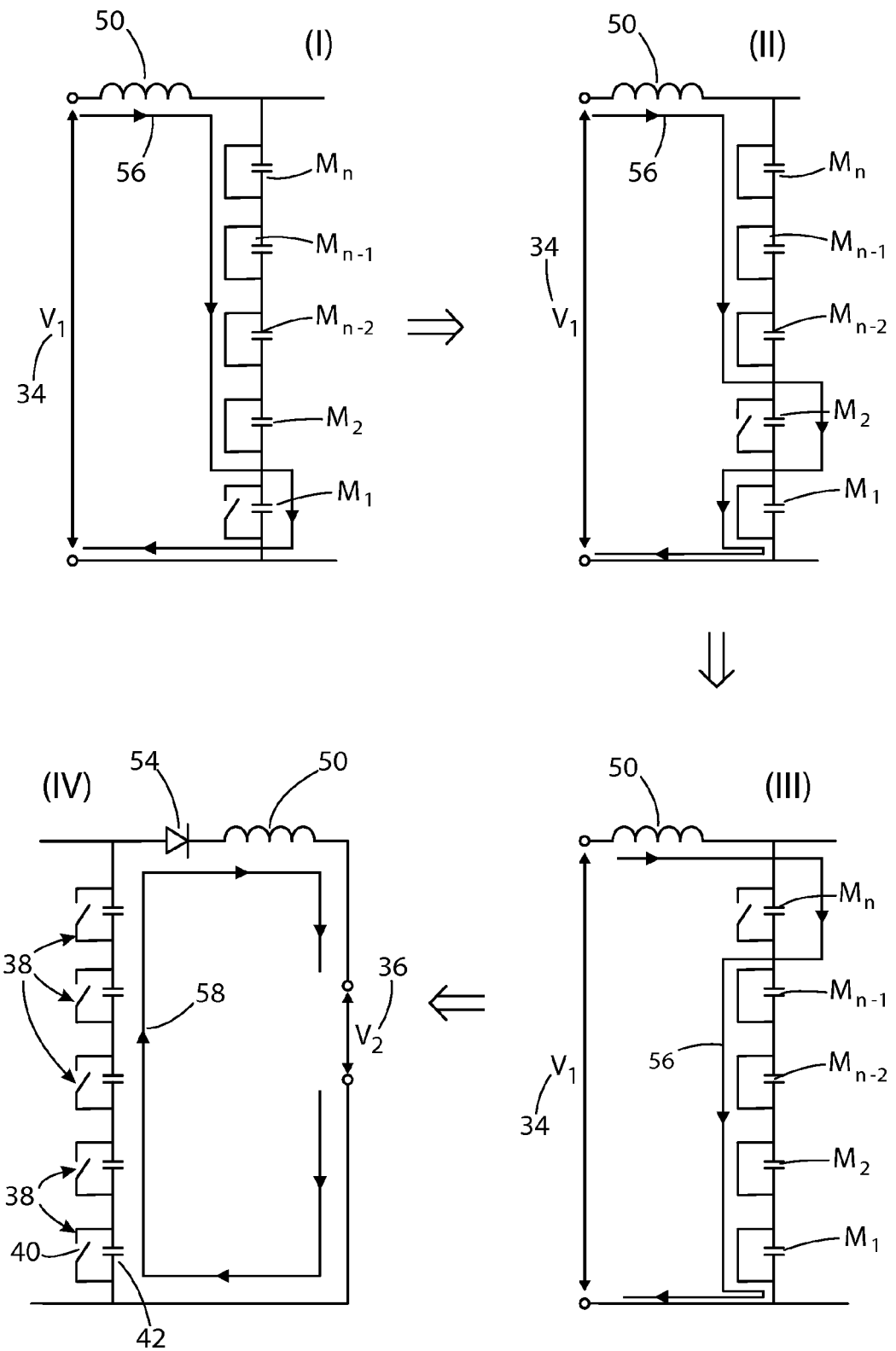
FIGS. 4A and 4B shows the charging and discharging steps of a parallel DC voltage source converter.

Referring to FIG. 4A, a module $M_1$ is inserted into the circuit by leaving its lower semiconductor switch 40 in an open position and closing the upper semiconductor switch 40 while the other modules $M_2 \ldots M_{n-1}, M_n$ are bypassed by closing their respective lower semiconductor switches 40.

The inserted module $M_1$ is then charged by the DC voltage connected to the first DC terminal 34, as shown by the charging current 56, until the capacitor 42 reaches a predetermined voltage level, which may be equal to the DC voltage connected to the first DC terminal 34.

The charged module $M_1$ is then bypassed by closing its semiconductor switches 40, and a different uncharged module $M_2$ is inserted into the circuit to be electrically charged. This charging process is repeated for a number of modules, as deemed necessary by a user. During the charging step the diode 54 is reverse-biased, which means that no current flows into the DC network connected to the second DC terminal 36.

The number of inserted chain-link modules 38 may be dynamically increased and decreased during the charging step to ensure that all charged modules 38 receive the same amount of electrical charge.

During the discharge step, the chain-link converter 32 is built up from a plurality of charged modules $M_1, M_2 \ldots M_{n-1}, M_n$ such that the voltage across the chain-link converter 32 is higher than the DC voltage of the DC network connected to the second DC terminal 36. The voltage across the chain-link converter 32 is the sum of the voltages of the inserted charged modules 38.

The charged modules 38 required to build up the chain-link converter 32 are inserted into the circuit by leaving their semiconductor lower switches 40 in the open position and their upper semiconductor switches in a closed position while any unused charged or uncharged modules 38 are bypassed by closing their respective lower semiconductor switches 40. The voltage difference between the chain-link converter 32 and the DC voltage of the DC network connected to the second DC terminal 36 causes the diode 54 to be forward biased, thereby causing the electrical energy stored in the inserted modules 38 to be discharged towards the DC network connected to the second DC terminal 36, as shown by the discharging current 58.

Given that the capacitors 42 will inherently discharge during the discharge cycle and thereby cause the voltage across the chain-link converter 32 to drop, the number of charged modules 38 used in the chain-link converter 32 may be progressively increased to maintain a desired output voltage profile.

Electrical power may therefore be transferred from the lower DC network connected to the first DC terminal 34 to the higher DC network connected to the second DC terminal 36 through the electrical charging and discharging of the chain-link modules 38 in the parallel DC voltage source converter 30.

Figure 4B:
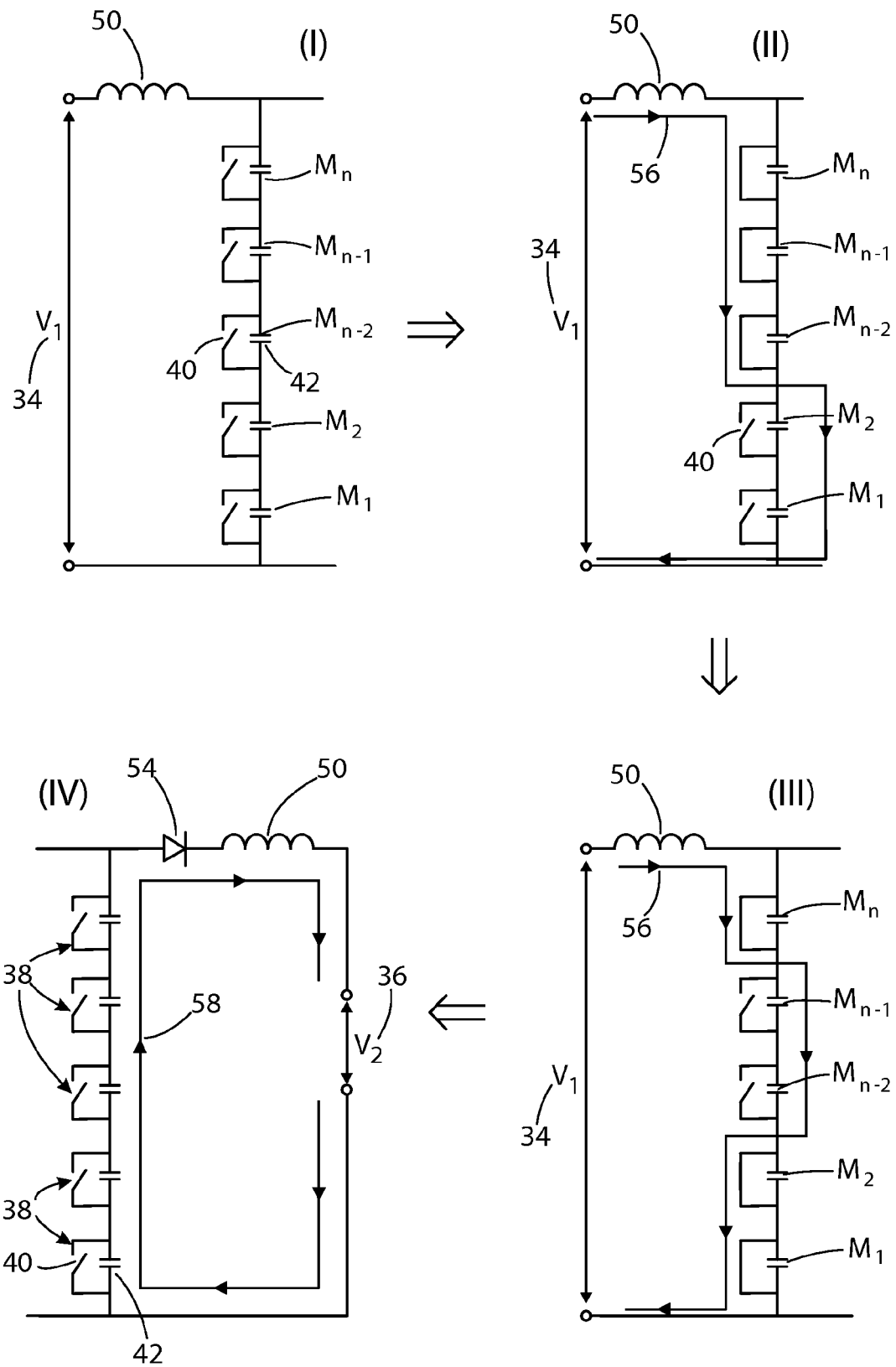

Referring to FIG. 4B, a plurality of modules 38 are inserted into the circuit to be simultaneously charged during the charging process instead of inserting a single module at a time. This enables a DC network to be connected to the first DC terminal 34 that has a DC voltage that which exceeds the capacity of each of the individual chain-link modules 38. The number of inserted modules 38 depends on the values of the DC voltage of the DC network connected to the first DC terminal 34 and the voltage capacity of each of the individual chain-link modules 38.

In embodiments employing the use of full-bridge elements 46 in the chain-link converter 32, the bidirectional characteristic of the 4-quadrant bipolar module 46 not only allows the parallel DC voltage source converter 30 to transfer power from a DC network having a lower DC voltage to a DC network having a higher DC voltage, but it also has the capability to provide voltage inversion between the DC networks.

Due to the bidirectional characteristic of the full-bridge elements 46, the switching assembly 48 is modified to connect two diodes in series and in opposite directions, whereby either diode may be bypassed if the preferred direction of the discharging current 58 causes the diode to be reverse biased.

Figure 5A:
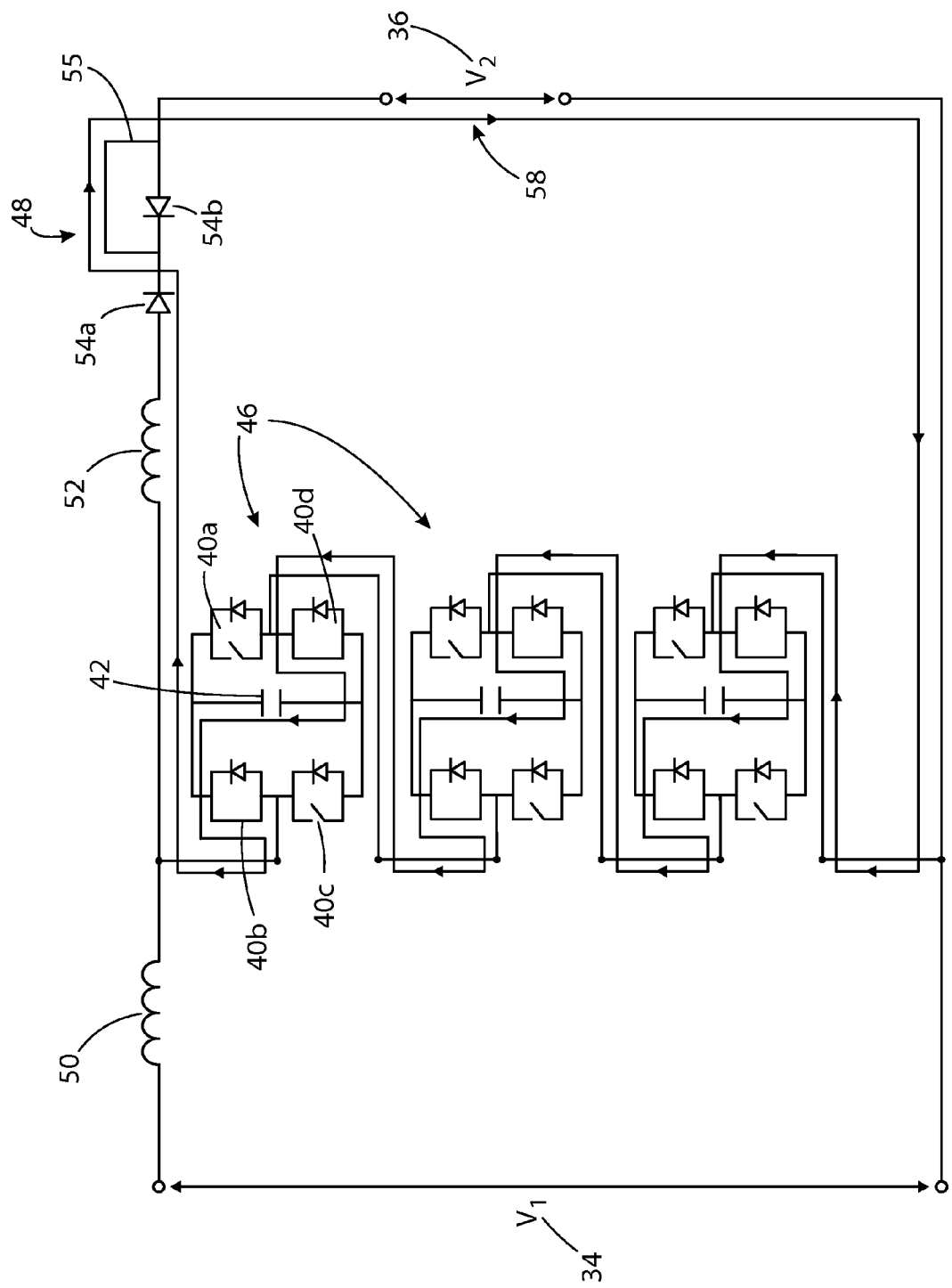
FIGS. 5A and 5B shows the bidirectional discharge capability of a parallel DC voltage source converter based on full-bridge elements.

In normal operation, as shown in FIG. 5A, the capacitor 42 in each charged full-bridge element 46 is inserted into the chain-link converter 32 such that the diode 54a is forward biased and the diode 54b is reverse biased. This is carried out by leaving semiconductor switches 40a, 40c in the open position and closing semiconductor switches 40b, 40d in each inserted full-bridge element 46 and shorting out the reverse biased diode 54b with a mechanical or semiconductor bypass switch 55.

Figure 5B:
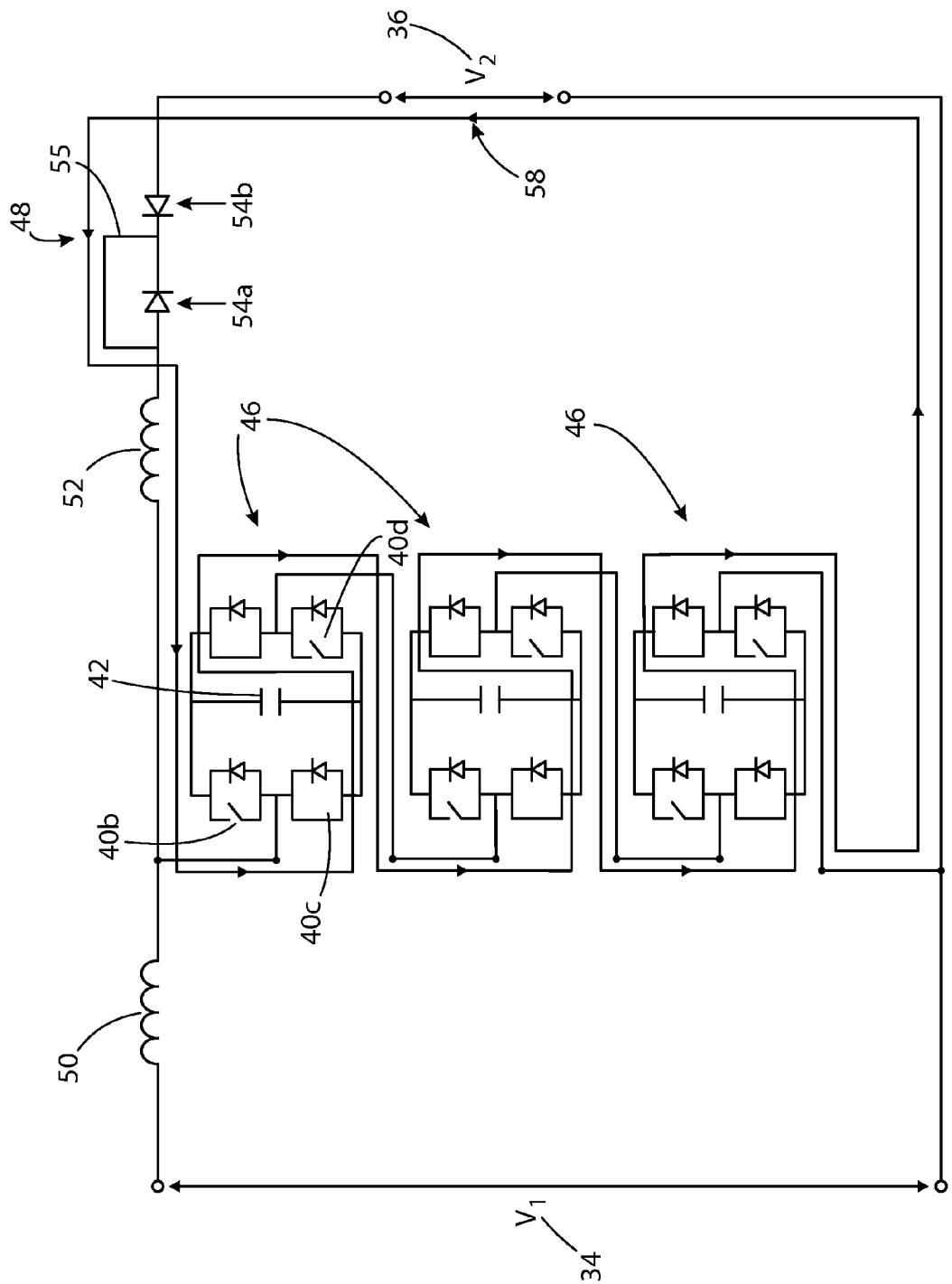

In order to provide voltage inversion, as shown in FIG. 5B, the capacitor 42 in each charged full-bridge elements 46 is inserted in the opposite direction in the chain-link converter 32 such that diode 54b is forward biased and diode 54a is reverse biased. This is carried out by leaving semiconductor switches 40b, 40d in the open position and closing semiconductor switches 40a, 40c in each inserted full-bridge element 46 and shorting out the reverse biased diode 54a with a mechanical or semiconductor bypass switch 55.

The discharging current 58 can therefore be in different directions depending on the positions of the semiconductor switches 40a, 40b, 40c, 40d in each full-bridge element 46.

Electrical power may therefore be transferred in inverted form from the DC network having a lower DC voltage to the DC network having a higher DC voltage through the electrical charging and discharging of the chain-link modules 38 in the parallel DC voltage source converter 30 based on the use of full-bridge elements 46.

Figure 6:
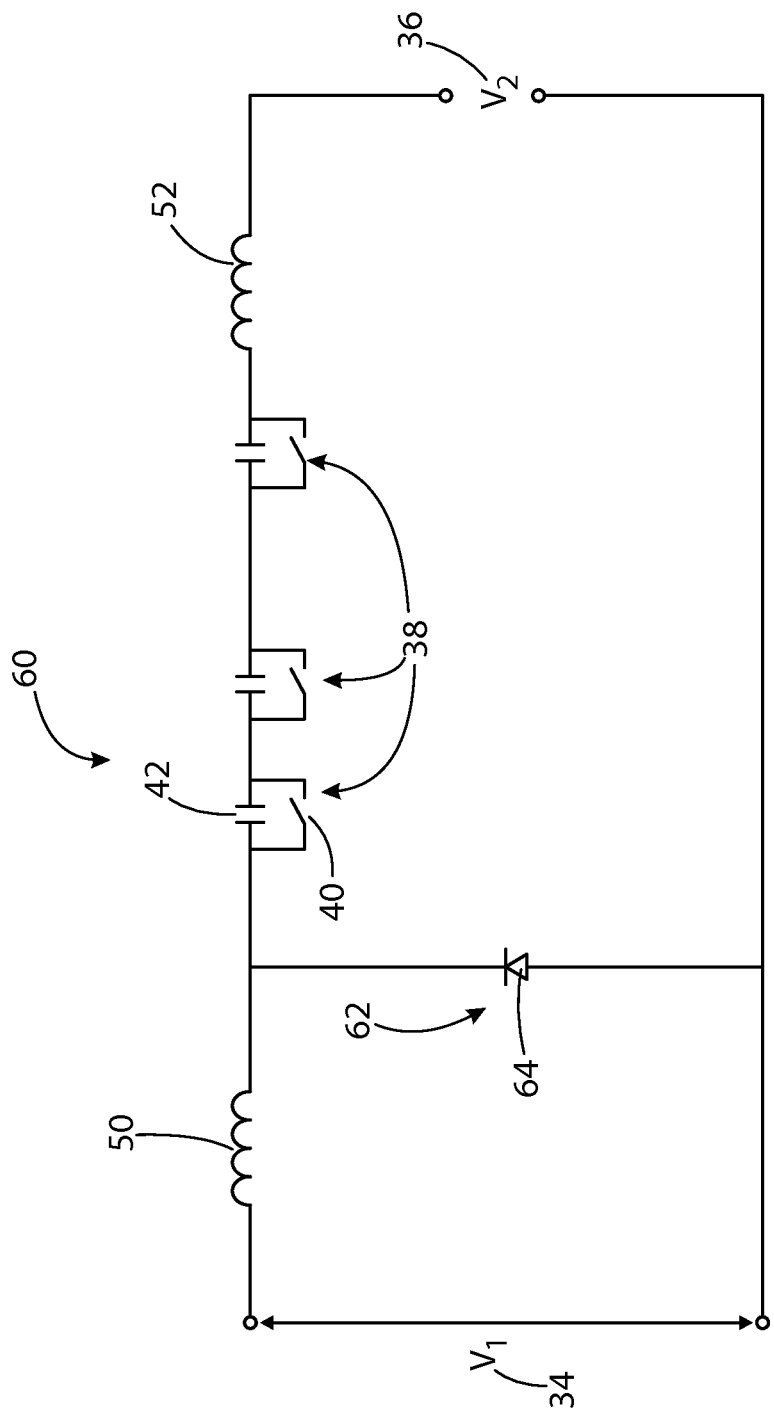
FIG. 6 shows a series DC voltage source converter according to a second embodiment of the invention.

A series DC voltage source converter 60 according to a second embodiment of the invention is shown in FIG. 6.

The chain-link converter 32 is connected in series with the DC voltage of the DC network connected to the second DC terminal 36. This series arrangement of the converter 32 and the second DC terminal 36 connected in parallel with the DC voltage of the DC network connected to the first DC terminal 34 and a switching assembly 62. A first inductor 50 is connected in series with the first DC terminal 34 while a second inductor 52 is connected in series with the second DC terminal 36.

The switching means 62 is utilised to toggle between electrical charging and discharging of the or each module 38, which are preferably half-bridge 44 or full-bridge elements 46. In this embodiment, the switching assembly 62 is constructed from a diode 64. In other embodiments however the switching assembly 62 may be replaced by any passive or active switching means that provides a similar function.

Operation of the converter 60 will now be described with reference to FIG. 7 in which a DC network is connected to the first DC terminal 34 having a DC voltage that is lower than the DC voltage of a DC network connected to the second DC terminal 36.

Each chain-link module 38 is kept at a minimum voltage level which is set at the design stage.

During the charging step, a plurality of modules 38 is inserted into the chain-link converter 32 such that the voltage across the chain-link converter 32 supports the differential voltage between the first and second DC terminals 34, 36. The voltage across the chain-link converter 32 is the sum of the voltages of the inserted charged modules 38.

As the chain-link modules 38 are continuously charged by the charging current 56, the voltage across each chain-link module 38 increases over time. The number of inserted modules 38 may therefore be reduced in a controlled cyclic manner until each inserted module 38 is charged to a predetermined level while maintaining the overall voltage across the chain-link converter 32.

During the discharge cycle, the chain-link converter 32 is built up from a plurality of charged modules 36 such that the voltage across the chain-link converter 32 is higher than the DC voltage of the DC network connected to the second DC terminal 36.

The charged modules 38 required to build up the chain-link converter 32 are inserted into the circuit by leaving their lower semiconductor switches 40 in the open position and upper semiconductor switches 40 in the closed position while any unused charged or uncharged modules 38 are bypassed by closing their respective lower semiconductor switches 40. When the voltage across the chain-link converter 32 is higher than the DC voltage of the DC network connected to the second DC terminal 36, it forward biases the diode 64 and also causes the formation of first and second discharging currents 58a, 58b for the chain-link modules 38.

The first discharging current 58a flows through the diode 64 and the chain-link converter 32 into the DC network connected to the second DC terminal 36, while the second discharging current 58b flows through the diode 64 into the DC network connected to the first DC terminal 34.

Electrical power may therefore be transferred from the higher DC network connected to the second DC terminal 36 to the lower DC network connected to the first DC terminal 34 through the electrical charging and discharging of the chain-link modules 38 in the series DC voltage source converter 60. The chain-link converter 32 is controllable to cycle through the modules 38 to ensure that all of the modules 38 are equally discharged. At the end of the discharge cycle, all of the modules 38 return to their minimum voltage levels and the charging cycle starts again.

Figure 7:
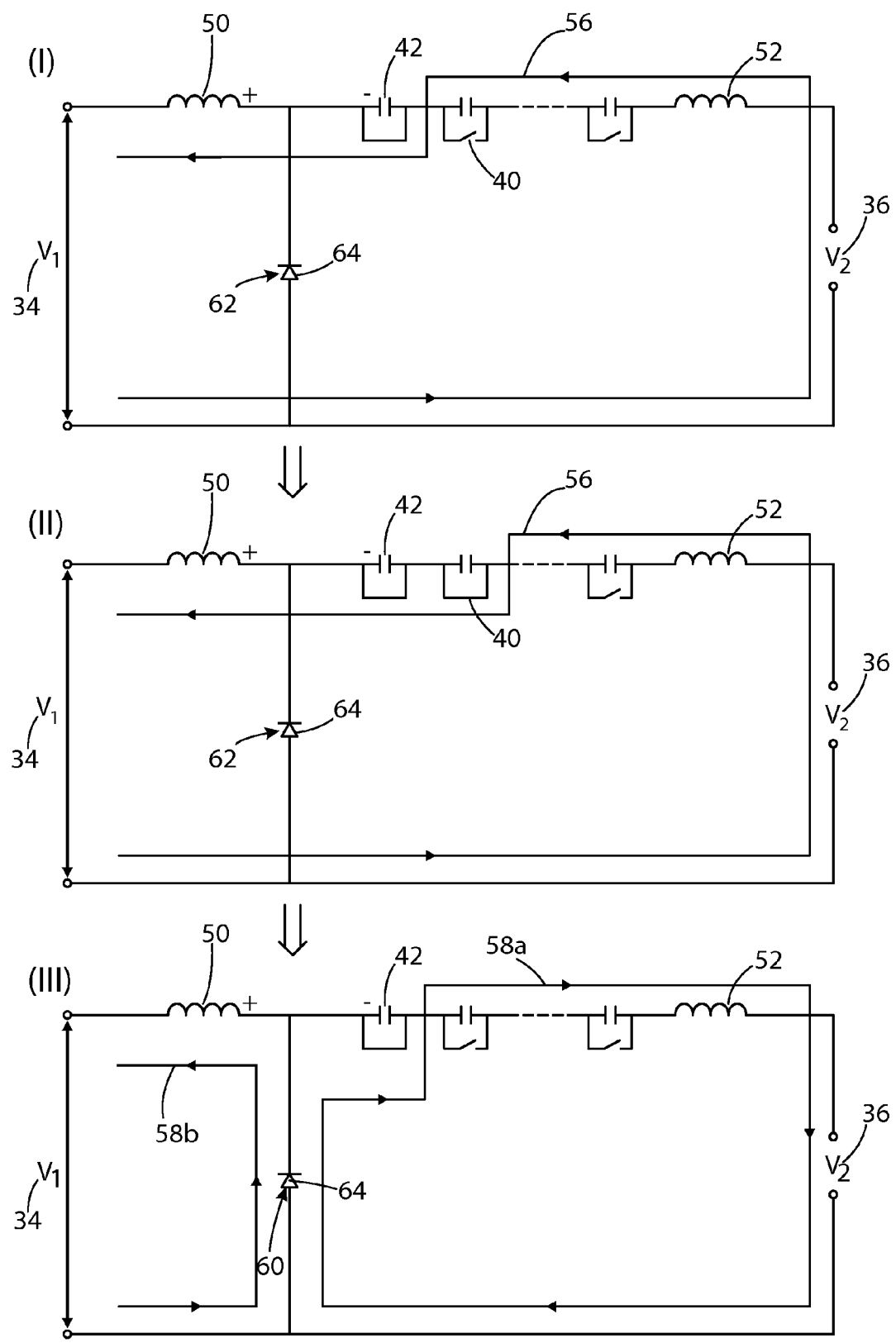
FIG. 7 shows the charging and discharging steps of a series DC voltage source converter.

In embodiments employing the use of full-bridge elements 46 in the chain-link converter 32, the bidirectional characteristic of the 4-quadrant bipolar module 46 not only allows the series DC voltage source converter 60 to provide a voltage step-down function as shown in FIG. 7, but it also has the capability to provide a voltage step-up function.

The voltage step-up function is carried out by closing and opening specific semiconductor switches to change the direction of the current flow in the full-bridge elements 46 and thereby, inserting the capacitor 42 in each full-bridge element 46 in the opposite direction in the chain-link converter 32. This action results in the voltage across the chain-link converter 32 being added to the DC voltage of the DC network connected to the second DC terminal 36, instead of being subtracted, and therefore, combining the voltages across the chain-link converter 32 and the series converter 60, thus stepping up the DC voltage of the DC network connected to the second DC terminal 36 to a higher voltage level.

Electrical power may therefore be transferred from a lower DC network to a higher DC network through the electrical charging and discharging of the chain-link modules 38 in the series DC voltage source converter 60 based on the bidirectional characteristic of full-bridge elements 46.

Series DC voltage source converters 60 employing the use of full-bridge elements 46 also have the advantage of being able to limit damage caused by faults in either of the DC networks connected to the first and second DC terminals 34,36.

When there is a fault in either of the DC networks, the semiconductor switches 40 are left in the open position, and the capacitor 42 in each chain-link module 38 naturally inserts a voltage that opposes the driving voltage through free-wheel diodes 64. In addition, the current flow is such that the capacitors 42 continue to charge in this mode until the fault current in either of the DC networks is extinguished.

Figure 8:
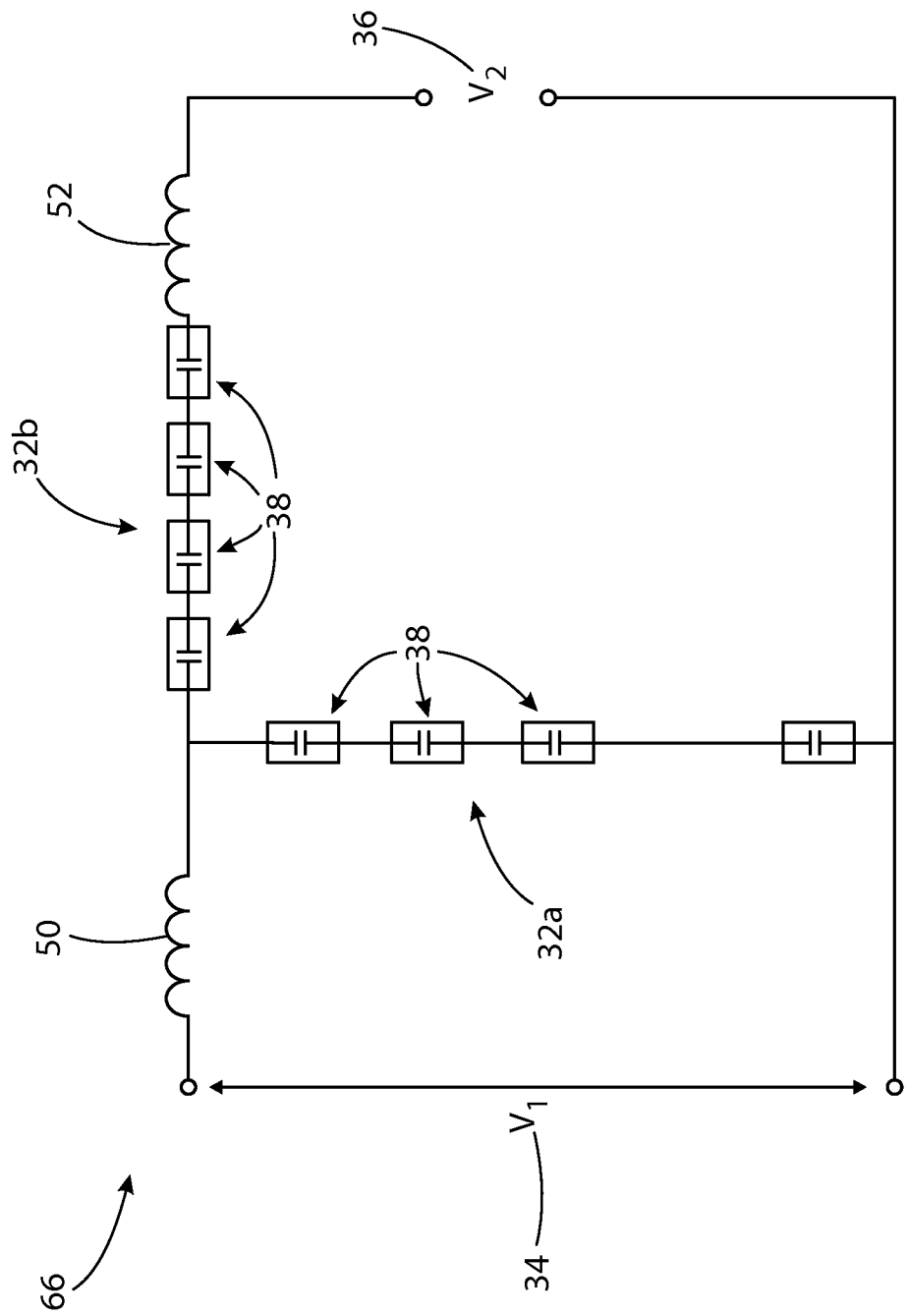
FIG. 8 shows a DC voltage source converter according to a third embodiment of the invention.

A DC voltage source converter 66 according to a third embodiment of the invention is shown in FIG. 8.

The DC voltage source converter 66 includes a first chain-link converter 32a connected in parallel with the DC network connected to the first DC terminal 34 and connected in parallel with the series arrangement of a second chain-link converter 32b and the DC network connected to the second DC terminal 36. A first inductor 50 is connected in series with the first DC terminal 34 while a second inductor 52 is connected in series with the second DC terminal 36.

In this embodiment, the switching assembly is replaced by the chain-link converters 32a, 32b which are controllable to perform switching operations previously carried out by the various switching means 48,62.

The combined DC voltage converter 66 provides a flexible arrangement which is capable of carrying out the functions of both the parallel 30 and series converters 60 in a single package.

The invention claimed is:

1. A DC voltage source converter for use in high voltage DC power transmission comprising at least one chain-link converter connected between first and second DC terminals, the or each chain-link converter including a chain of modules connected in series and each module including at least one pair of semiconductor switches connected in parallel with an energy storage device, wherein the or each chain-link converter is operable when DC networks are connected to the first and second DC terminals to control switching of the modules to selectively charge or discharge the energy storage device of one or more of the modules, as required, to offset any difference in the DC voltage levels of the DC networks and wherein further including a switching assembly to toggle between electrical charging and discharging of the or each module of the or each chain-link converter, the or each chain-link converter being connected in parallel with the first DC terminal and with a series arrangement of the second DC terminal and the switching assembly or a series arrangement of the or each chain-link converter and the second DC terminal is connected in parallel with the first DC terminal and is connected in parallel with the switching assembly.

2. A DC voltage source converter according to claim 1, wherein each semiconductor switch comprises an insulated-gate bipolar transistor.

3. A DC voltage source converter according to claim 2, wherein each energy storage device-is a capacitor, a battery, a fuel cell, an AC electrical machine with recitification, a DC electrical machine or another voltage source capable of providing a source of real power.

4. A DC voltage source converter according to claim 1, wherein each energy storage device is a capacitor, a battery, a fuel cell, an AC electrical machine with recitification, a DC electrical machine or another voltage source capable of providing a source of real power.

5. A DC voltage source converter according to claim 1, wherein the semiconductor switches of each module are connected with the respective energy storage device in a half-bridge arrangement to define a 2-quadrant unipolar module that can develop zero or positive voltage and can conduct current in both directions.

6. A DC voltage source converter according to claim 1, wherein the semiconductor switches of each module are connected with the respective energy storage device in a full-bridge arrangement to define a 4-quadrant bipolar module that can develop positive or negative voltage and can conduct current in both directions.

7. A DC voltage source converter according to claim 6, wherein the semiconductor switches of each module are operable in a fault condition to remain in an open position.

8. A DC voltage source converter according to claim 1, wherein the switching assembly includes one or more diodes.

9. A DC voltage source converter according to claim 1, wherein the switching assembly is a second chain-link converter, the or each chain-link converter being called the first chain-link converter.

10. A DC voltage source converter according to claim 1, wherein the DC voltage source converter includes one or more inductors connected in series with one or both of the first and second DC terminals.

* * * * *